US 9,418,397 B2

(12) United States Patent
Haase et al.

(10) Patent No.: US 9,418,397 B2
(45) Date of Patent: Aug. 16, 2016

(54) START-UP PROCESSING TASK DISTRIBUTION AMONG PROCESSING UNITS

(71) Applicant: Harman International Industries, Incorporated, Stamford, CT (US)

(72) Inventors: Robert Haase, Farmington Hills, MI (US); Gregory Dale, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 229 days.

(21) Appl. No.: 14/063,960

(22) Filed: Oct. 25, 2013

(65) Prior Publication Data
US 2015/0116342 A1 Apr. 30, 2015

(51) Int. Cl.
*G06T 9/00* (2006.01)
*G06T 1/60* (2006.01)
*G06T 1/20* (2006.01)

(52) U.S. Cl.
CPC .... *G06T 1/60* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 7,543,077 | B1* | 6/2009 | Milliken et al. | 709/245 |
| 7,594,233 | B2* | 9/2009 | Gootherts et al. | 718/105 |
| 8,860,741 | B1* | 10/2014 | Juffa et al. | 345/557 |
| 2007/0067679 | A1* | 3/2007 | Deobald | 714/36 |
| 2007/0079150 | A1* | 4/2007 | Belmont et al. | 713/300 |
| 2011/0169840 | A1* | 7/2011 | Bakalash | 345/505 |
| 2011/0197048 | A1* | 8/2011 | Chung et al. | 712/30 |
| 2015/0070369 | A1* | 3/2015 | Frascati et al. | 345/539 |
| 2015/0091915 | A1* | 4/2015 | Hurd et al. | 345/506 |
| 2015/0106609 | A1* | 4/2015 | Koszek | 713/2 |

* cited by examiner

*Primary Examiner* — Kee M Tung
*Assistant Examiner* — Frank Chen
(74) *Attorney, Agent, or Firm* — Alleman Hall McCoy Russell & Tuttle LLP

(57) ABSTRACT

Embodiments are disclosed for distributing processing tasks during a start up routine for a computing device between a central processing unit (CPU) and a graphics processing unit (GPU). In some embodiments, a method of loading an operating system for a computing device with a CPU includes receiving power from a power supply and locating a master boot record in a non-volatile storage device. The method further includes copying a first portion of a compressed operating system image from an address indicated by the master boot record to a location in a volatile storage device and instructing a GPU to decompress the first portion of the compressed operating system image in the volatile storage device.

19 Claims, 6 Drawing Sheets

START-UP PROCESSING TASK DISTRIBUTION AMONG PROCESSING UNITS

FIELD

The disclosure relates to start up routines for a computing device including a central processing unit and a graphics processing unit.

BACKGROUND

Start up routines, also referred to as boot up routines, for a computing device typically include moving compressed files from a location in a non-volatile storage device to a location in volatile memory (e.g., RAM). The compressed files may then be decompressed and executed to continue the start up routine to start a particular operating system associated with the decompressed files. The start up routine may be performed by a central processing unit (CPU), which is configured for quickly switching between tasks and generally governing most activity on the computing device. Many computing devices also have a graphics processing unit (GPU) configured for performing repetitive tasks even more quickly than a CPU. As the GPU largely handles graphics processing for visual elements displayed on a display device, the GPU may include multiple shader programs for performing tasks related to rendering images for display.

SUMMARY

During typical start up routines, the graphics processing unit does not contribute to the various start up tasks. Embodiments are disclosed for increasing the efficiency of start up routines by distributing tasks among both the central processing unit and the graphics processing unit of a computing device. In some embodiments, a method for loading an operating system for a computing device with a central processing unit (CPU) includes receiving power from a power supply and locating a master boot record in a non-volatile storage device. The method further includes copying a first portion of a compressed operating system image from an address indicated by the master boot record to a location in a volatile storage device and instructing a graphics processing unit (GPU) to decompress the first portion of the compressed operating system image in the volatile storage device.

In some embodiments, a computing device for distributing a processing load for an operating system start up routine may include a non-volatile memory device storing a compressed operating system image, a volatile memory device, a GPU communicatively connected to the non-volatile memory device and the volatile memory device, and a CPU. The CPU may be configured to execute instructions stored in the non-volatile memory device to determine a plurality of portions of a compressed operating system image, load a first portion of the operating system image into volatile memory, and load a second portion of the operating system image into volatile memory. The CPU may be further configured to execute instructions to instruct the GPU to decompress the first portion of the operating system image, and decompress the second portion of the operating system image.

In additional or alternative embodiments, a system for determining a distribution of a decompression load includes a non-volatile memory device, a volatile memory device, a GPU and a CPU. The CPU may be configured to execute instructions to determine a decompression load for the GPU defining an amount of decompression to be performed by the GPU, instruct the GPU to decompress a first portion of a compressed operating system image stored in the volatile memory device of the computing device, and determine a decompression speed of the GPU. The CPU may further be configured to execute instructions to, during a first condition, decrease the decompression load on the GPU and, during a second condition, increase the decompression load on the GPU.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a start up routine may involve performing repetitive tasks, such as decompressing an image for loading an operating system. A central processing unit (CPU) may be capable of switching between tasks quickly and directing workflow through a computing system by including a relatively small number of arithmetic/logic units (ALUs) and relatively complex controllers for the ALUs (e.g., compared to a graphics processing unit). The advanced control capabilities of the CPU enables the unit to be suitable for directing functions for the computing device as a whole and quickly switching between processing tasks. While the CPU can perform repetitive tasks, the relatively large number of ALUs of a graphics processing unit (GPU) may perform such repetitive tasks more quickly than the CPU. By utilizing such resources of the GPU under the direction of the CPU to perform repetitive tasks, such as operating system image decompression, during a distributed start up routine, the distributed start up routine may be completed more quickly than start up routines performed by a CPU alone.

Figure 1:
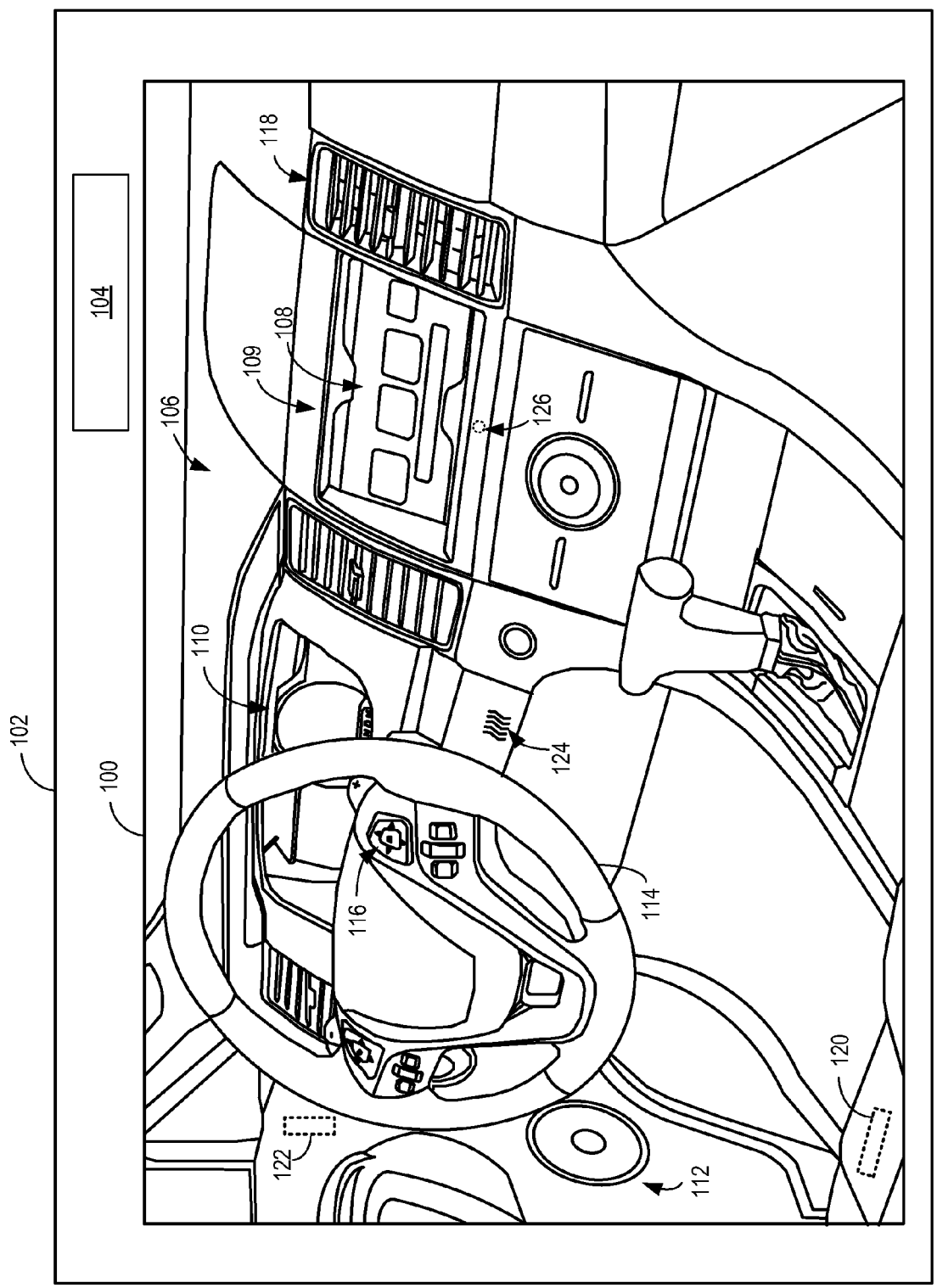
FIG. 1 is a partial view of a vehicle cabin including an in-vehicle computing system and a mobile device, in accordance with one or more embodiments of the present disclosure.

Any suitable computing device including a CPU and a GPU may utilize one or more of the distributed start up routines described in the disclosure. A distributed start up routine may enable a computing device in a time-sensitive environment to boot up more quickly than start up routines utilizing only a CPU. For example, an in-vehicle computing device may benefit from a quick start up routine by enabling a user to quickly access navigational, radio, and other vehicle-related functions that may be controlled by the in-vehicle computing device. FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver of vehicle 102, such as a touch screen 108 of an in-vehicle computing device 109 (e.g., an infotainment system), an audio system control panel, and an instrument cluster 110. While the example system shown in FIG. 1 includes audio system controls that may be performed via a user interface of an in-vehicle computing device such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the audio system controls may control a volume of audio output, a distribution of sound among the individual speakers of the vehicle speaker system, an equalization of audio signals, and/or any other aspect of the audio output.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing device and to control the in-vehicle computing device. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc.

Figure 2:
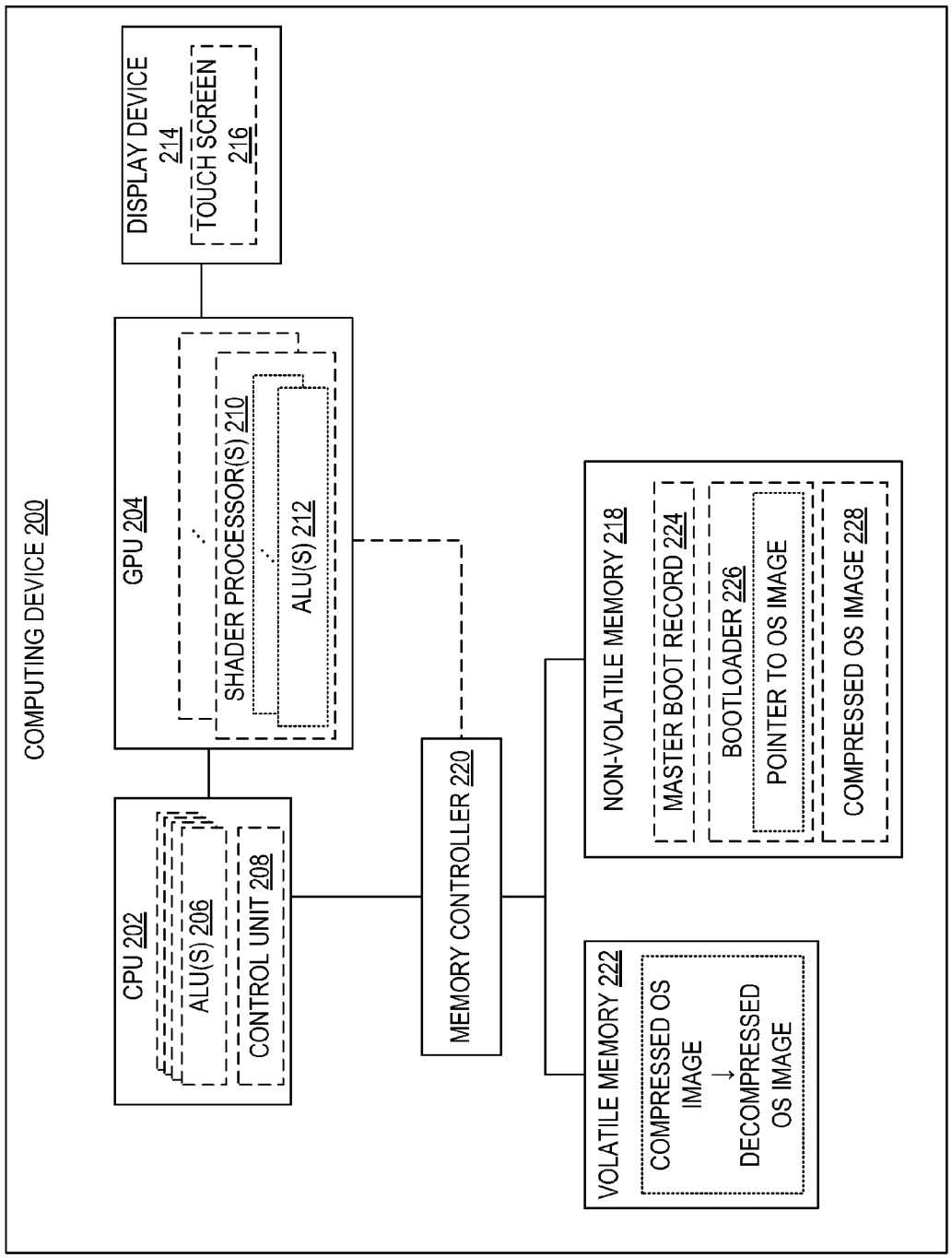
FIG. 2 shows a block diagram of computing device, in accordance with one or more embodiments of the present disclosure.

FIG. 2 shows a block diagram of a computing device 200 including a CPU 202 and a GPU 204. For example, the computing device 200 may correspond to the in-vehicle computing device 109 of FIG. 1. The computing device 200 may alternatively correspond to another computing device, such as a smart phone, a laptop, a tablet, a media player, a personal computer, a home entertainment device, and/or any other suitable computing device including a CPU and a GPU. The CPU 202 may include a plurality of Arithmetic Logic Units (ALUs) 206 for performing operations on data as instructed by a control unit 208. Although the CPU 202 is illustrated as including four ALUs 206, it is to be understood that the CPU 202 may include any number of ALUs. For example, the CPU 202 may include one or more cores, and each core may include one or more ALUs. Although not illustrated, it is to be understood that additional or alternative elements may be included in CPU 202, such as memory registers/caches, floating point units, decoders/encoders, interfaces, etc.

Similar to the one or more cores of the CPU 202, the GPU 204 may include one or more shader processors 210 configured to fetch an instruction (e.g., from a shader program) and perform operations on data in accordance with the fetched instruction. For example, shader programs may provide instructions for different GPU processes for altering raw image data to render an image for display. The shader programs may include vertex, geometry, and/or pixel shader programs for adjusting (e.g., shading, coloring, lighting, etc.) and/or mapping features of an image to create a displayable image having a particular appearance. The shader programs also include decompression programs for decompressing data, such as a compressed operating system image. Each shader 210 may include one or more ALUs 212 for performing the operations described above. The control unit 208 of the CPU 202 may enable the CPU 202 to make decisions and switch between tasks more efficiently than the GPU 204, however the GPU 204 may include more ALUs in total than the CPU 202, enabling the GPU 204 to perform repetitive processes more efficiently than the CPU 202. In some embodiments, each shader 210 of the GPU 204 may include more ALUs than each core of the CPU 202 and/or the GPU 204 may include a larger number of shaders 210 than the number of cores in the CPU 202. For example, a CPU may include two or four cores with one ALU in each core, while a GPU may include eight or sixteen shaders with four or eight ALUs in each shader.

As illustrated, the GPU 204 interfaces with a display device 214, which may include a touch screen 216 or other suitable display for providing visual output to a user of the computing device 200. The shaders 210 of the GPU 204 may be configured to retrieve and execute shader programs on the GPU 204, which may be stored in non-volatile memory 218. As described above, some shader programs may include routines for rendering a displayable image for display on the display device 214. Additional or alternative shader programs may include routines for decompressing data. For example, shader programs for rendering a displayable image may be used to synthesize large amounts of data. By compressing and/or decompressing the data in the GPU, the overall size of data sets that are processed by the GPU may be reduced, thereby increasing portability of the data. As described in more detail below, shader programs of the present disclosure may include algorithms to enable the GPU 204 to decompress data during a start up routine of the computing device.

The GPU 204 may access the non-volatile memory 218 via the CPU 202 and/or via a memory controller 220. The memory controller 220 may manage access to the storage devices of the computing device 200, including non-volatile memory 218 and volatile memory 222 (e.g., RAM). In some embodiments, the memory controller may be integrated within the CPU 202, while in other embodiments the memory controller 220 may be external to the CPU 202.

The non-volatile memory 218 may include any non-volatile memory device, such as a hard disc drive, flash memory device, EEPROM, etc. In order to boot the computing device 200 and start up an operating system stored on the non-volatile memory 218, a master boot record (MBR) 224 may be stored in the non-volatile memory 218. The MBR 224 may include instructions to identify different partitions of the non-volatile memory 218 and/or the location of a bootloader 226 on a bootable partition of the non-volatile memory 218. The bootloader 226 may include non-transitory instructions to be executed by the CPU to locate and transfer a compressed operating system (OS) image 228 into volatile memory 222. For example, the bootloader 226 may include a pointer to an address of the compressed OS image 228 in the non-volatile memory 218. The OS image may provide instructions and/or configuration information to start up or otherwise load an operating system on the computing device 200. For example, the OS image may be a collection of data including files defining the operating system (e.g., program(s) that allows applications for the computing device to run and enables interaction between the user/applications and hardware elements of the computing device), a state of the operating system at the last shut down event (e.g., user preferences, application states, etc.), and commands that are configured to be executed by the CPU to start up the operating system. The OS image may be generated, compressed, and stored on non-volatile storage responsive to a shut down of the computing device 200 in order to preserve the state of the operating system in a more permanent location than volatile storage.

The CPU 202 may control the transfer of the compressed OS image 228 into the volatile memory 222, as well as the decompression of the compressed OS image 228. Accordingly, the volatile memory may store the compressed OS image 228 and/or portions of the compressed OS image 228 temporarily until the transferred compressed OS image is processed to form a decompressed OS image. After decompressing the compressed OS image, the volatile memory may store the decompressed OS image. In some embodiments, the decompressed OS image may occupy the same volatile memory location(s) as the compressed OS image, thereby overwriting the compressed OS image with the decompressed OS image. In other embodiments, the decompressed OS image may be stored in a different location from the compressed OS image.

As described in more detail below with respect to FIGS. 3-6, shader programs may be stored in non-volatile memory 218 to enable the GPU 204 to assist with and/or perform all of the decompression of the OS image in volatile memory 222. For example, the bootloader 226 may include instructions for the CPU 202 to transfer the compressed OS image 228 to volatile memory 222 and instruct the GPU 204 to decompress the transferred compressed OS image and/or portions of the transferred compressed OS image responsive to the transfer. The CPU 202 may transfer or otherwise identify the shader programs for performing the decompression for the GPU 204 before the GPU 204 accesses the compressed OS image data from volatile memory 222 so that the GPU 204 may fetch and/or decode the shader programs, decompress the OS image as instructed, and output the decompressed OS image to the volatile memory 222.

The shader programs may be adapted to decompress a compressed operating system image by separating the algorithms of the shader programs into small work packages that are able to read/write to smaller local caches during decompression. For example, the compressed OS image may include an index or an index may be generated in the CPU and/or GPU and associated with the compressed OS image. The index may identify which portion of the compressed OS image is to be decompressed by which shader processor of the GPU. In other words, the index may map each shader processor to a different portion of the compressed OS image. In other embodiments, the index may not directly map the shader processors to different compressed OS image portions. Instead, the index may provide information to identify each portion of the compressed OS image, identify a relative order of the compressed OS image, and/or provide information, for each portion of the compressed OS image, associated with the final uncompressed OS image (e.g., a relative or absolute position of the decompressed data for the portion of the OS image in the final uncompressed OS image, a decompression key or code for performing the decompression, etc.). Accordingly, in some embodiments, each GPU shader processor may receive and/or access the index to determine a starting point for decompressing a portion of the compressed OS image. In additional or alternative embodiments, the CPU may receive and/or access the index and directly assign portions of the compressed OS image to each GPU shader processor.

In some embodiments, the OS image may be compressed in a format that is suited for the GPU-accelerated decompression. For example, the OS image may be compressed in accordance with a compression scheme utilized by another shader program of the GPU (e.g., a DXT or PVRTC compression scheme, and/or any suitable shader program that performs a routine related to rendering an image for display). In additional or alternative embodiments, the OS image may be compressed with a selected compression scheme for achieving a particular size (e.g., a total size of the compressed image or an amount of size reduction after compression) and/or speed (e.g., speed of compression/decompression by the GPU) parameter. For example, the compression routine may take advantage of repeating patterns in the OS image data to represent a particular symbol (e.g., a particular arrangement of a number of bits) with an encoded symbol having fewer bits than the original symbol (e.g., using entropy encoding). The compression scheme may utilize range encoding so that the OS image data may be encoded on a byte level (e.g., each encoded symbol includes eight bits). Encoding on a byte level leverages the parallel processing of the GPU to decompress the OS image more quickly than an OS image compressed on a bit level (e.g., each encoded symbol includes one bit). An OS image compressed on a bit level includes a larger number of encoded symbols than an OS image compressed on a byte level. As each of the shader processors of the GPU may be able to process (e.g., decompress) one byte of data per cycle, a larger portion of the total OS image may be decompressed by the GPU per cycle when utilizing byte-level encoding as opposed to bit-level encoding.

The decompression routine utilized by the GPU may be the same as the decompression routine utilized by the CPU in order to enable both the CPU and GPU to decompress the OS image simultaneously and/or without additional formatting of the OS image (e.g., without changing the compression of the OS image to conform to a decompression routine utilized by the GPU). Thus, the CPU may decompress one or more portions of the compressed OS image in parallel (e.g., simultaneously) with the GPU. The compression scheme may be lossless in order to ensure that the decompressed OS image is identical to the original OS image and no data is lost. In other embodiments, however, the GPU may utilize a different decompression routine than the CPU in order to leverage the different processing affinities of the GPU and the CPU. For example, the CPU may be more efficient at decompressing arithmetically encoded data, while the GPU may be more efficient at decompressing range encoded data. Thus, the OS image may be compressed using different compression schemes for data that is decompressed in the GPU and data that is decompressed in the CPU. For example, a first portion of the OS image may be compressed using arithmetic encoding, while a second portion of the OS image may be compressed using range encoding. In additional or alternative embodiments, the OS image may be first compressed using a first compression scheme and then a portion of the compressed OS image may be compressed (e.g., by the CPU) using a second, different compression scheme. In order to avoid redundant decompression and/or errors from simultaneous memory read/write requests, the CPU 202 and/or the memory controller 220 may manage the CPU 202 and the GPU 204 access to the volatile memory 222.

Figure 3:
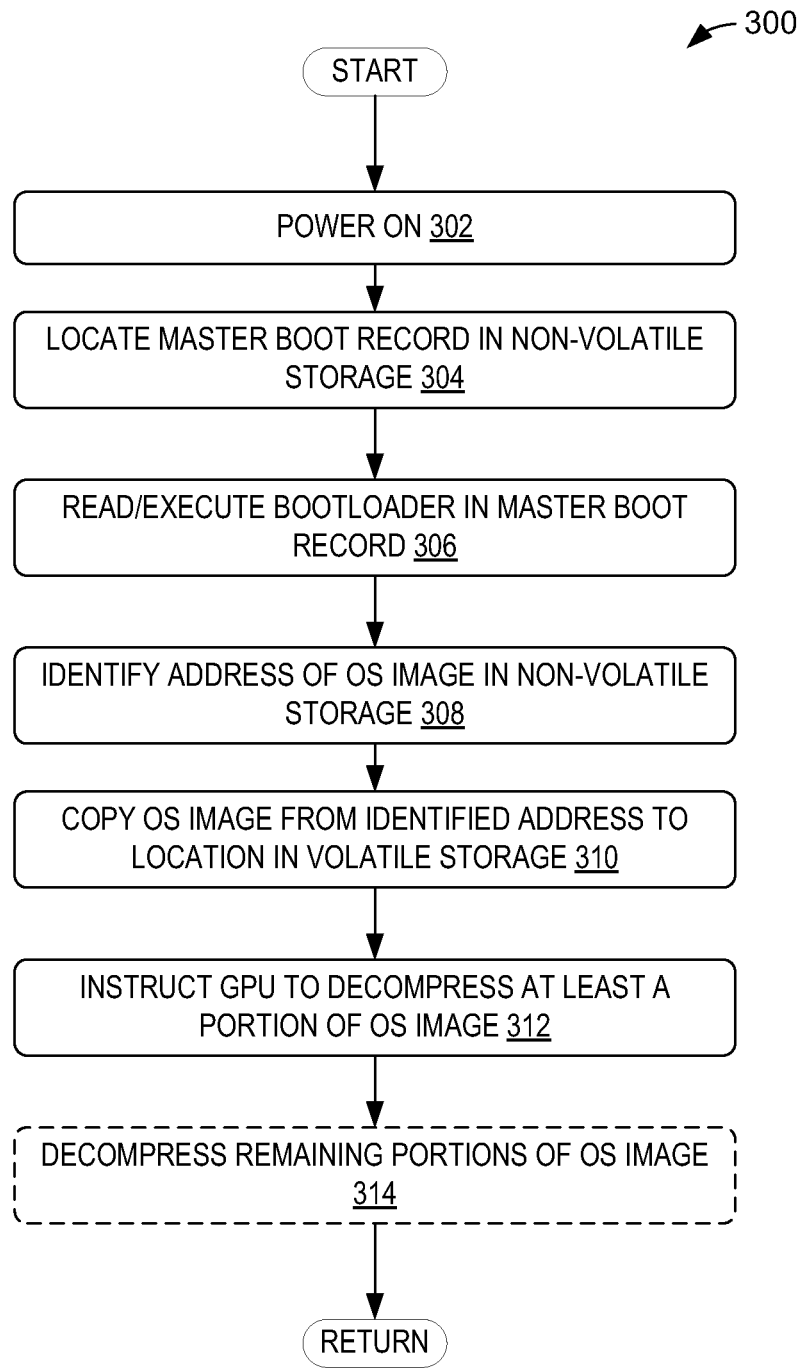
FIG. 3 is a flow chart of an example method of performing a start up routine for a computing device, in accordance with one or more embodiments of the present disclosure.

FIG. 3 is a flow chart of an example method 300 for performing a start up routine for a computing device, such as computing device 200 of FIG. 2. In particular, the method 300 may be performed by a CPU of a computing device, such as CPU 202 of FIG. 2. The start up routine may begin by powering on the computing device and/or the CPU, as indicated at 302. The CPU may be hard wired and/or hard coded to locate a Master Boot Record in non-volatile storage, as indicated at 304. That is, the CPU may have a default configuration that ensures that the CPU always responds to a power on condition by locating the MBR and/or otherwise locating information to load an operating system. Upon locating the MBR, the method 300 includes reading and/or executing a bootloader identified, indicated, and/or stored within the MBR, as indicated at 306.

The bootloader may include information and/or instructions to enable the CPU to identify the address of an operating system image in non-volatile storage, as indicated at 308. For example, the bootloader may include a pointer to an address in non-volatile memory at which a compressed OS image is stored. Responsive to locating the compressed OS image in the non-volatile memory, the method proceeds to 310 to copy the compressed OS image from the identified address to a location in volatile storage (e.g., RAM). The CPU may copy or otherwise transfer the compressed OS image to a predetermined location in volatile storage in some embodiments, while in other embodiments, the bootloader or other instruction may specify a location in volatile storage for storing the compressed OS image.

The CPU may instruct a GPU of the computing device (such as GPU 204 of FIG. 2) to decompress at least a portion of the compressed OS image stored in volatile memory, as indicated at 312. As described above with respect to FIG. 2, the GPU may include a plurality of shader processors, each having a plurality of ALUs. As the ALUs for each shader processor may be controlled as a group by the shader processor, a single shader processor may distribute sequential tasks of an instruction to decompress a portion of an image across the individual ALUs in parallel to increase a speed of executing the instruction (in comparison with performing such tasks with a single ALU). The GPU may further increase execution speed of a request to decompress an OS image by performing such decompression in parallel across the shader processors of the GPU. For example, each shader processor may decompress different portions of the image simultaneously. Accordingly, a CPU may instruct the GPU to decompress multiple portions of the OS image in parallel. The instructions from CPU may designate a particular shader program (e.g., a decompression algorithm) to be used by each shader processor of the GPU.

In response to the instructions from the CPU, each shader processor of the GPU may fetch a portion of the compressed OS image (e.g., a byte of compressed data as designated by an index) and decompress the portion of the compressed OS image in parallel with one another (e.g., substantially simultaneously). For example, a shader program for each shader processor may designate a particular operation to be performed on the compressed OS image data to recover the original OS image data associated with that portion of the compressed OS image data. Each shader processor may then output the decompressed data to the CPU and/or the volatile memory. In some embodiments, the decompressed data output by the GPU may be stitched together (e.g., each decompressed symbol of data may be arranged in the correct relative order) by the GPU or by the CPU prior to being loaded into volatile memory.

For embodiments in which the CPU instructs the GPU to decompress a portion of the compressed OS image that is smaller than the complete OS image, the method 300 proceeds to 314 at which the CPU decompresses the remaining portions of the OS image. The CPU may decompress one or more of the remaining portions of the OS image while the GPU is decompressing a different portion of the OS image in some embodiments. In other embodiments, the CPU may decompress one or more of the remaining portions of the OS image sequentially, before or after the GPU decompresses a different portion of the OS image. For example, the compressed OS image may include a plurality of encoded symbols arranged in a particular order. The CPU may decompress sequential symbols while the GPU is not decompressing symbols so that the order of the symbols is maintained upon completing decompression. Alternatively, the CPU may decompress and/or instruct the GPU to decompress a set of symbols in parallel, and the order of the symbols may be maintained by the CPU by accessing an index of the OS image and reordering/joining decompressed symbols after completing decompression.

In some embodiments, the compression and/or decompression of the OS image is lossless, such that the decompressed OS image includes the same data and is the same format as the original OS image prior to compression. As the decompression of the OS image may include splitting the compressed OS image in portions, the decompressed OS image may be stitched back together as described in more detail below with respect to FIG. 6. The CPU may then execute instructions provided by the decompressed OS image to continue the start up routine and load and/or configure the operating system and associated applications.

Figure 4:
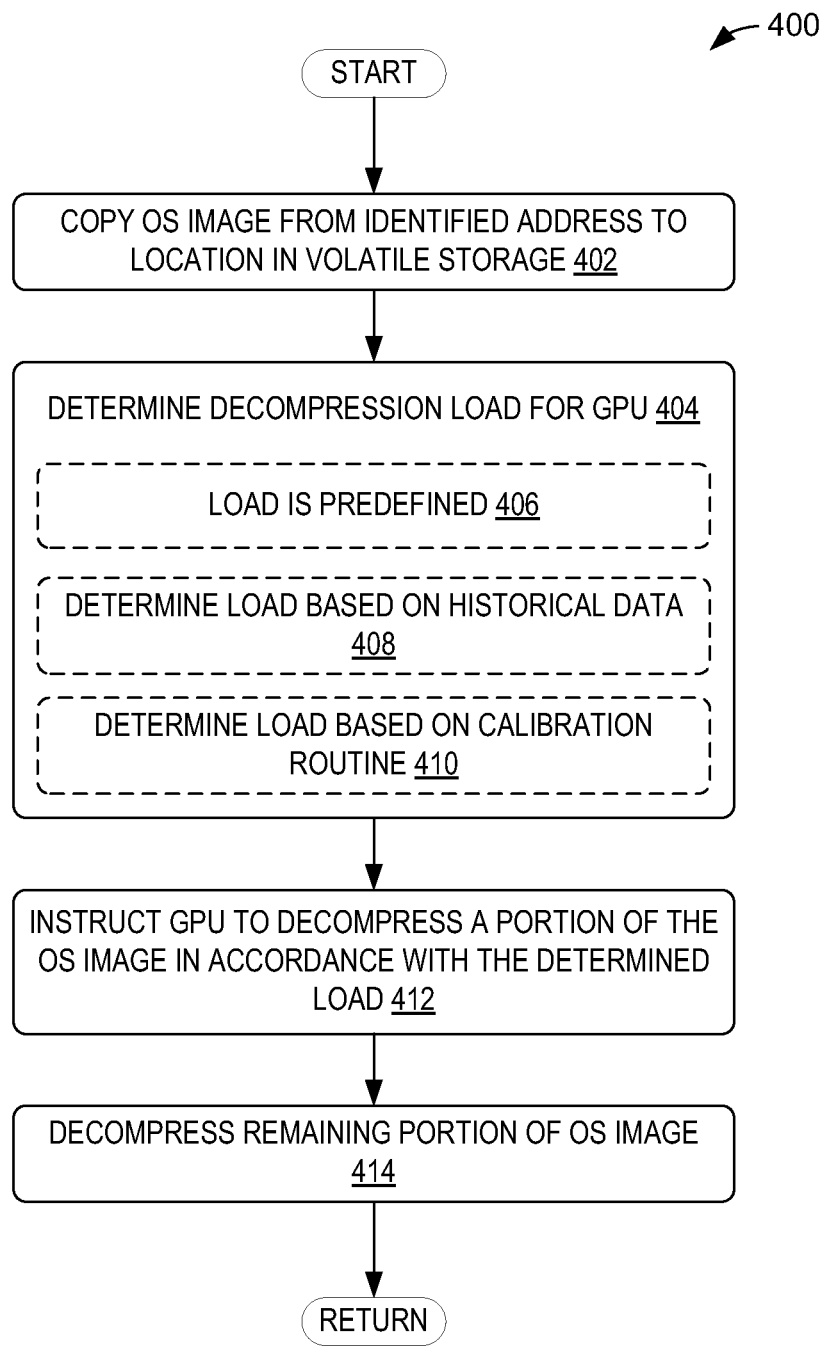
FIG. 4 is a flow chart of an example method for distributing start up processing tasks, in accordance with one or more embodiments of the present disclosure.

FIG. 4 is a flow chart of a method 400 of distributing the processing load for decompressing the OS image between a CPU and a GPU of a computing device. For example, the method may be performed responsive to and/or during execution of step 310 of method 300, illustrated in FIG. 3. Accordingly, method 400 includes copying an OS image from an identified address to a location in volatile storage, as indicated at 402. For example, the CPU of the computing device (e.g., CPU 202 of FIG. 2) may copy the OS image from an address identified by a bootloader to a location in volatile storage. At 404, the method 400 includes determining a decompression load for a GPU of the computing device (e.g., GPU 204 of FIG. 2). The load may be predefined for the CPU, as indicated at 406, such that the CPU distributes decompression processing between the CPU and the GPU based upon a stored and/or hard wired rule. For example, the decompression load may be predefined as a particular decompression order (e.g., decompressing with the GPU only after the CPU has decompressed for a certain amount of time and/or has decompressed a specified portion of the image), a particular quantity of portions of a compressed OS image, a specified portion and/or percentage of a compressed OS image, a function of time/cycles related to the decompression task, and/or any other suitable distribution function.

In some embodiments, the load may be determined based on historical data, as indicated at 408. For example, configuration information and/or operating parameters/conditions for previously-performed decompression routines (e.g., decompression of an OS image and/or other decompression routines) may be stored along with an indication of decompression speed (e.g., in units of time and/or processing cycles), resource usage, start up time, temperature measurements, and/or any other suitable indication of decompression efficiency or effects of the decompression on the system. In such examples, the CPU may determine a decompression load that provides historically stable system operation and/or a highest recorded decompression speed. The CPU may evaluate the historical data in light of a present configuration. For example, the decompression results associated with operating parameters and/or OS image sizes/formats that are dissimilar to a current decompression task may be weighted less than other decompression results and/or ignored when determining a decompression load for a GPU.

As indicated at 410, the decompression load distribution may be based on a calibration routine. For example, the GPU may perform a portion of the decompression at various loads to determine a decompression load for a GPU that provides a highest measured decompression speed, a lowest start up time, and/or otherwise decreases start up time with a nominal impact on system stability. It is to be understood that determining decompression load may incorporate any combination of the examples provided above and/or other suitable determination routines in some embodiments. For example, the CPU may begin a calibration routine as indicated in 410 by setting a GPU decompression load to a predefined load, as indicated in 406.

Figure 5:
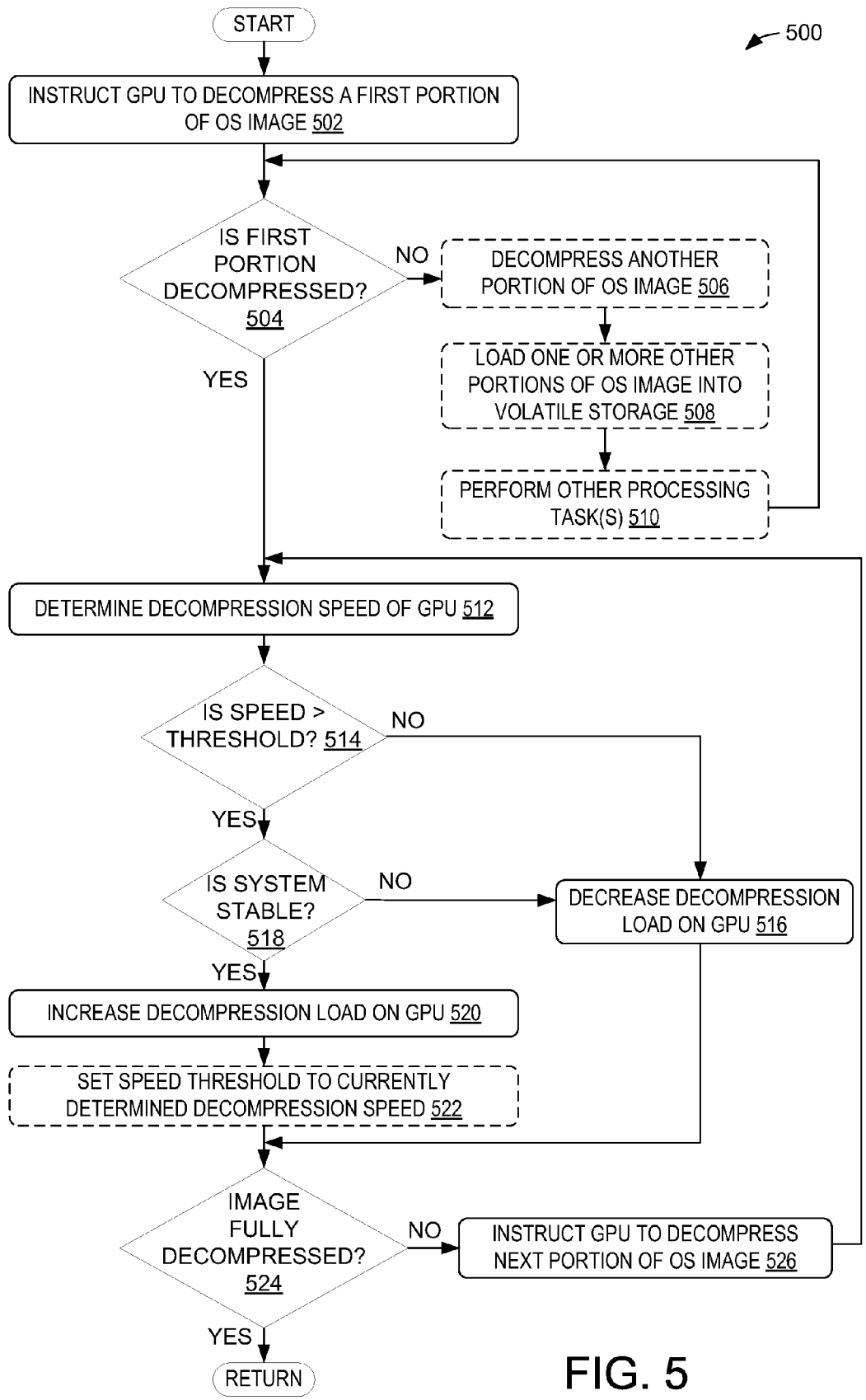
FIG. 5 is a flow chart of an example start up processing load calibration method, in accordance with one or more embodiments of the present disclosure.

Turning to FIG. 5, an example method 500 of performing a start up processing load calibration is shown. The method 500 may be performed to determine a distribution of processing for decompressing an operating system image between a CPU and a GPU for a computing device during a start up routine. For example, the method 500 may be performed during step 404 of method 400 (shown in FIG. 4) by a CPU of a computing device (e.g., CPU 202 of FIG. 2). The method 500 includes instructing a GPU to decompress a first portion of an OS image, as indicated at 502. At 504, the method 500 includes determining if the GPU completed the decompression of the first portion. While the GPU is performing the decompression and the first portion is not completely decompressed, the CPU may wait for the decompression to complete without performing any tasks (e.g., remain idle) in some embodiments. In other embodiments, the CPU may perform other tasks to simulate tasks that may be performed while the GPU is decompressing under normal (e.g., non-calibration) operating conditions. For example, the CPU may decompress another portion (e.g., other than the first portion) of an OS image while the GPU is decompressing the first portion of the OS image, as indicated at 506. Additionally or alternatively, the CPU may load one or more other portions of the OS image into volatile storage while the GPU is decompressing the first portion of the OS image, as indicated at 508. As indicated at 510, the CPU may perform other processing tasks while the GPU is decompressing the first portion of the OS image. It is to be understood that the CPU may perform one or more of the processing tasks described in steps 506-510 and/or remain idle simultaneously (e.g., each core of the processor may perform a different task or one or more core may perform no processing task while other cores perform other processing tasks). In some embodiments, the CPU may alternately perform tasks and/or remain idle at different points in time. For example, the CPU may first decompress a second portion of the OS image and then load other portions of the OS image into volatile storage if the GPU has not finished decompressing the first portion of the OS image when the CPU completes decompression of the second portion of the OS image. Upon completing one or more processing tasks, the method 500 may return to 504 to determine if the first portion has been decompressed. It is to be understood that the completion of decompression of the first portion may serve as an interrupt to wake the CPU from an idle state and/or interrupt a current processing task of the CPU, so that the method may proceed to 512.

Once the CPU determines that the first portion has been decompressed at step 504, the method 500 may proceed to 512 to determine a decompression speed of the GPU. For example, an amount of time and/or processing cycles that elapse between a start of decompression of the first portion of the OS image by the GPU and a completion of the decompression of the first portion of the OS image may be measured and compared to an amount of the OS image that was decompressed (e.g., a percentage of the OS image and/or a size of the first portion) to determine the decompression speed. The GPU may additionally or alternatively transmit a confirmation message to the CPU including an indication of decompression completion and/or measured data relating to the decompression performance (e.g., processing cycles and/or time elapsed, resources utilized, etc.) in order to assist with the decompression speed determination.

As indicated at 514, the speed at which the GPU performed the decompression of the first portion of the OS image may be compared to a threshold to determine whether the speed is greater than the threshold. The speed threshold may be predefined and/or determined by the CPU. For example, the speed threshold may be based on a prior speed determination in order to compare a current decompression speed to a maximum (or maximum stable) measured decompression speed. In additional or alternative embodiments, the threshold speed may correspond to a decompression speed that results in an OS image having an average size (e.g., as measured over multiple start up routines) being completely decompressed within a target period of time and/or processing cycles. For example, a target period of time may be some period of time that is smaller than the minimum or average recorded time to decompress an OS image with only a CPU performing the decompression. Accordingly, a calibration routine in which decompression is performed by only the CPU and a total decompression time is either measured or calculated (e.g., based on a decompression speed for decompressing a portion of the OS image) may be performed prior to or while decompressing the first portion of the image with the GPU.

If the decompression speed is not greater than a threshold at 514, the method 500 proceeds to 516 to decrease a decompression load on the GPU. For example, decreasing the decompression load on the GPU may include instructing the GPU to decompress a smaller percentage of the OS image than previously/currently instructed and/or to decompress a smaller number of OS image portions than previously/currently instructed. Decreasing the decompression load on the GPU may thereby include increasing the decompression load on the CPU. The previously instructed GPU decompression load may have included performing decompression on an entire OS image. Under such conditions, decreasing the GPU decompression load may include enabling the CPU to decompress a portion of the OS image.

If the decompression speed is greater than a threshold at 514, the method 500 may proceed to determine if the system is stable, as indicated at 518. In some embodiments, the CPU may determine whether the system is stable by comparing operating conditions and/or parameters to predefined limits, as the predefined limits may indicate operating conditions and/or parameters present in a stable system. For example, the system may be capable of stable operation at a range of CPU and/or GPU temperatures that include a maximum and a minimum temperature. Accordingly, the system may be determined to be stable if a measured temperature is greater than the minimum temperature and less than the maximum temperature. It is to be understood that a plurality operating conditions and/or parameters may be examined at 518 to determine whether the system is stable. The system may be determined to be unstable if one or more of the operating conditions and/or parameters are outside of an acceptable limit and/or otherwise indicate unstable performance. If the system is considered to be unstable at 518, the method 500 proceeds to 516 to decrease a decompression load on the GPU. Accordingly, even if the GPU achieves a speed above the threshold speed, the decompression load on the GPU may be reduced if the current load is deemed to affect the stability of the system. In this way, errors may be reduced and the lifespan of the computing device may be increased.

If the system is determined to be stable at 418, the method 500 proceeds to increase the decompression load on the GPU at 520. For example, increasing the decompression load on the GPU may include instructing the GPU to decompress a larger percentage of the OS image than previously/currently instructed and/or to decompress a larger number of OS image portions than previously/currently instructed. Increasing the decompression load on the GPU may thereby include decreasing the decompression load on the CPU. The previously/currently instructed GPU decompression load may have included performing decompression on a portion OS image (e.g., a portion smaller than the entire OS image). Under such conditions, increasing the GPU decompression load may include stopping OS image decompression with the CPU.

As indicated at 522, the method 500 may optionally include setting a speed threshold to a currently determined decompression speed. Updating the threshold to reflect a current speed may be utilized to determine whether decompression speed is increasing with each adjustment to decompression load in order to determine the effectiveness of such adjustments. Setting the decompression speed in this manner may also enable the determination of a maximum decompression speed by measuring a peak measured decompression speed.

The method 500 includes determining whether the OS image is fully decompressed at 524. If the OS image is not fully decompressed (e.g., if all portions of the OS image have not been decompressed and a portion of the OS image remains compressed), the method 500 may proceed to 526 to instruct the GPU to decompress a next portion of the OS image in accordance with an adjusted decompression load. The method 500 may then return to 512 to determine a decompression speed of the GPU and determine further adjustments to the decompression load between the GPU and the CPU. If the OS image is fully decompressed (e.g., if all portions of the OS image have been decompressed and no portions of the OS image remain compressed), then the method 500 may return (e.g., to perform another decompression load determination, to instruct the GPU to decompress a portion of the OS image in accordance with the determined load at 412 of method 400, and/or to load the decompressed OS image for continuing the start up routine). In some embodiments, a decompression load and/or decompression speed determined most recently upon fully decompressing the OS image may be stored in a memory device and/or otherwise output by the CPU.

It is to be understood that the method 500 may be terminated and/or exited at other points in the routine in addition or as an alternative to the OS being fully decompressed. The method 500 may be exited upon detecting any suitable interrupt and/or exit condition. For example, the method 500 may be terminated upon determining a maximum decompression speed of the GPU. For embodiments in which the speed threshold is set to a currently determined decompression speed at 522, a maximum speed may be determined as the highest and/or last recorded decompression speed after a determined decompression speed at 512 is less than the speed threshold when evaluated at 514.

Returning to FIG. 4, the method 400 may continue to 412 to instruct a GPU to decompress a portion of the OS image in accordance with the determined load (e.g., the decompression load determined at 404). At 414, the method 400 includes decompressing a remaining portion of the OS image. For example, if the GPU is instructed to decompress a portion of the OS image that is smaller than the entire OS image, the CPU may decompress any remaining portions of the OS image in parallel and/or sequentially with the GPU.

Figure 6:
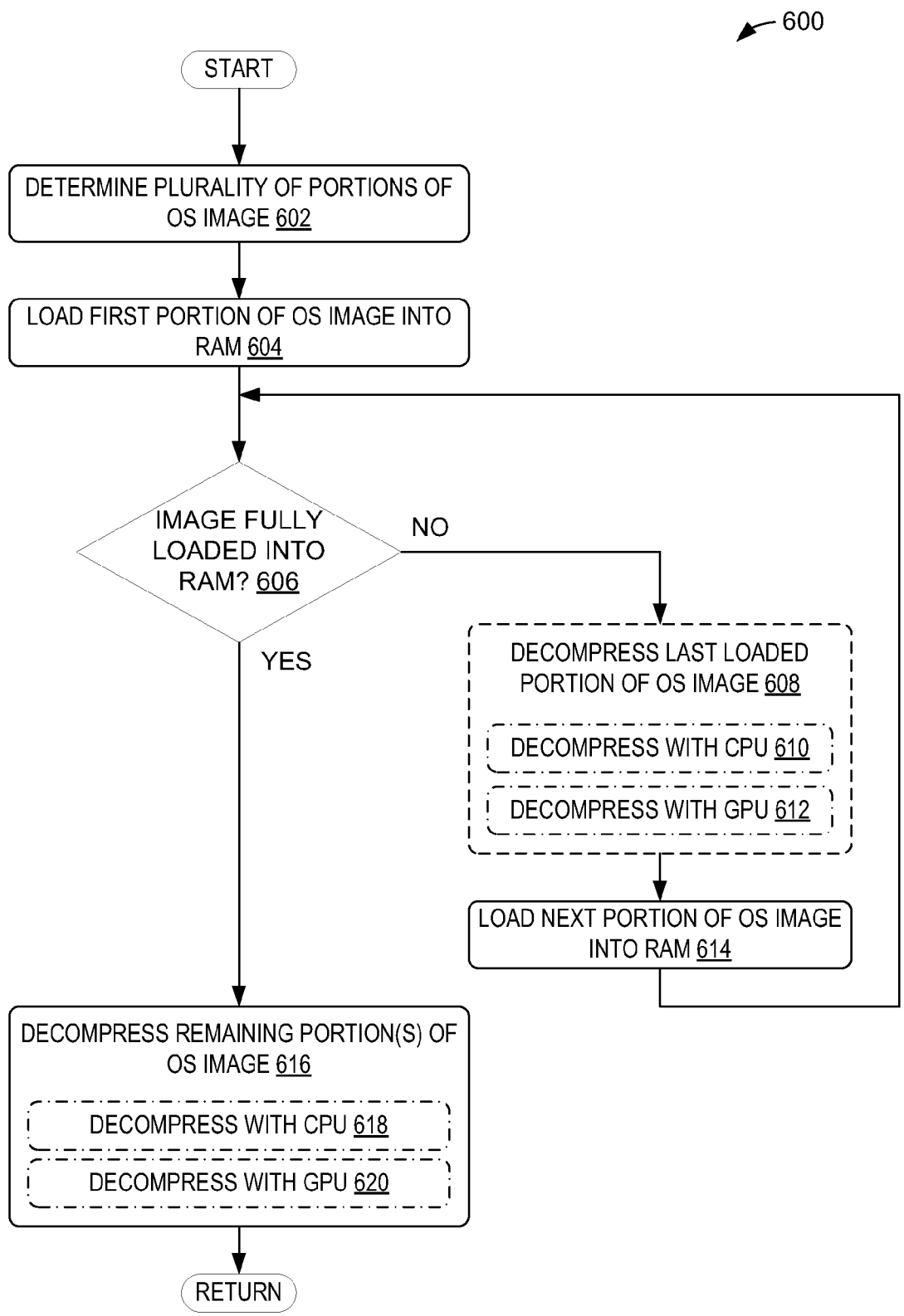
FIG. 6 is a flow chart of an example method for decompressing an operating system image with a central processing unit and a graphics processing unit, in accordance with one or more embodiments of the present disclosure.

FIG. 6 is a flow chart of an example method 600 for segmenting and decompressing an operating system image in portions with a central processing unit and a graphics processing unit. The method 600 may be performed by a CPU of a computing device, such as CPU 202 of FIG. 2. The method 600 includes determining a plurality of portions of the OS image at 602. For example, the OS image may be segmented into a plurality of portions based upon a predefined segmenting policy, and instruction in the bootloader (or other location in memory), historical data (e.g., a last-used segmentation), and/or any other suitable policy. The segmenting policy may define a size (e.g., a proportion or absolute size) for each portion and/or a total number of portions for the OS image. The segmenting policy may be stored in a lookup table with a plurality of possible portion sizes and/or numbers of portions defined for different operating states/conditions/parameters, OS image sizes, OS image types, CPU and/or GPU specifications/configurations, etc. In some embodiments, the compressed OS image may be segmented prior to or during compression, such that the compressed OS image is stored as a plurality of compressed portions of the OS image. In other embodiments, the compressed OS image may be segmented after compression, such that the compressed OS image is stored in non-volatile memory as a single file and segmented into multiple portions (e.g., by the CPU and/or GPU) immediately before or during transfer of the compressed OS image into volatile memory. It is to be understood that the segmentation of the OS image may be based on constraints of the storage device. Accordingly, the OS image may be segmented into portions that are sized in accordance with a smallest unit of storage for the non-volatile and/or volatile memory. For example, the compressed OS image may be a single file that is stored across multiple memory blocks of the non-volatile storage device, and each portion of the compressed OS image may include data stored in a single block or a particular number of blocks.

At 604, the method 600 includes loading a first portion of the OS image into volatile storage, such as RAM. The CPU may determine whether the OS image is fully loaded into RAM, as indicated at 606. For example, the OS image may be fully loaded into RAM when all portions are stored in RAM. If the OS image is not fully loaded into RAM, the method 600 continues to optionally decompress a last loaded portion of the OS image (e.g., the portion of the OS image that was most recently loaded into RAM), as indicated at 608. For example, the last loaded portion of the OS image may be decompressed with the CPU at 610 and/or the GPU at 612, in accordance with a determined decompression distribution load. The method 600 includes loading a next portion of the OS image into RAM at 614, then returning to 606 to determine whether the OS image is fully loaded into RAM. If the OS image is fully loaded into RAM (e.g., if all portions of the OS image are stored in RAM), the method 600 continues to 616 to decompress a last loaded portion and/or any remaining portions of the OS image. For example, the last loaded and/or remaining portions of the OS image may be decompressed with the CPU at 618 and/or the GPU at 620, in accordance with a determined decompression distribution load. Upon decompressing each portion of the OS image and/or upon completing the decompression for the entire OS image, the OS image may be stitched together such that the image is stored as one file and/or is no longer segmented into multiple portions. The OS image may be stitched together in accordance with predefined instructions in some embodiments, while in additional or alternative embodiments, the segmentation of the OS image may be recorded and used as a guide for restoring the rejoined OS image.

For example, the GPU and/or the CPU may stitch the OS image together as portions are decompressed by following an index indicating a relative position of each portion of decompressed OS image data in a final, decompressed OS image file. In some embodiments, the GPU may pass along unstitched decompressed data to the CPU for joining, while in other embodiments, the GPU may stitch together portions of the OS image that are decompressed by multiple shader processors in parallel and pass the joined portions to the CPU for joining with other decompressed portions. For example, the CPU may join decompressed portions once all portions have been decompressed (e.g., storing decompressed portions in a local register or other memory location temporarily while other portions are being decompressed) and control a write operation to store a decompressed, joined OS image on the volatile memory device. As a result of any or all of the above-identified methods for stitching together the OS image, the decompressed, joined OS image may be identical to the original OS image as configured prior to segmentation and/or compression so that the data and/or the format of the decompressed, joined OS image is unchanged from the original OS image.

By utilizing the processing resources of the GPU of a computing device to assist in decompressing an operating system image at start up, the start up time of the computing device may be reduced. As users often start a computing device when use of the computing device is desired, the reduced start up time enables the user to being interacting with the computing device more quickly after powering the device on. In some environments, quickly starting a computing device may allow other systems to be used more quickly, enhancing a user experience of a system as a whole. For example, a quick start up time for an in-vehicle computing system, such as an infotainment device, enables a user to begin setting a navigation destination, adjusting climate control, and/or tuning to a radio station while a vehicle is warming up.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle interface system and/or computing device described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method of loading an operating system for a computing device with a central processing unit (CPU), the method comprising:
  performing an operating system initialization routine prior to starting the operating system of the computing device, the operating system initialization routine comprising:
    receiving power from a power supply,
    locating a master boot record in a non-volatile storage device,
    copying a first portion of a compressed operating system image corresponding to the operating system from an address indicated by the master boot record to a location in a volatile storage device, and
    instructing a graphics processing unit (GPU) to decompress the first portion of the compressed operating system image in the volatile storage device to generate at least a portion of a decompressed operating system image, the GPU including a plurality of shader processors configured to fetch instructions from shader programs stored in the non-volatile storage device and perform operations on data in accordance with the fetched instructions, and the CPU assigning portions of the operating system image to each shader processor of the GPU; and
  executing instructions provided by the decompressed operating system image to load the operating system.

2. The method of claim 1, further comprising determining a decompression load for the GPU defining an amount of the compressed operating system image that is assigned to be performed by the GPU.

3. The method of claim 2, wherein determining the decompression load for the GPU comprises identifying a predefined decompression load for the GPU.

4. The method of claim 2, wherein determining the decompression load for the GPU comprises determining the decompression load based on historical data from one or more previously executed start up routines.

5. The method of claim 2, wherein determining the decompression load for the GPU comprises performing a calibration routine, and wherein the calibration routine includes instructing the GPU to decompress data, determining a decompression speed of the GPU, and adjusting the decompression load based on the decompression speed of the GPU.

6. The method of claim 1, wherein the GPU is instructed to compress the first portion of the compressed operating system image after the first portion of the compressed operating system image is copied into the volatile storage device and before the entire compressed operating system image is copied into the volatile storage device.

7. The method of claim 1, further comprising copying remaining portions of the compressed operating system image from the address indicated by the master boot record to the volatile storage device, instructing the GPU to decompress a first amount of the remaining portions of the compressed operating system image, and decompressing a second amount of the remaining portions of the compressed operating system image with the CPU.

8. A computing device for distributing a processing load for an operating system start up routine, the computing device comprising:
a non-volatile memory device storing a compressed operating system image;
a volatile memory device;
a graphics processing unit (GPU) communicatively connected to the non-volatile memory device and the volatile memory device, the GPU including a plurality of shader processors; and
a central processing unit (CPU) configured to execute instructions stored in the non-volatile memory device to:
determine a plurality of portions of the compressed operating system image;
load a first portion of the operating system image into volatile memory;
load a second portion of the operating system image into volatile memory;
instruct the GPU to decompress at least the first portion of the operating system image, the CPU assigning portions of the operating system image to each shader processor of the GPU to decompress; and
decompress the second portion of the operating system image.

9. The computing device of claim 8, further comprising a display device communicatively connected to the GPU, wherein the GPU interfaces with the display device, and wherein the GPU is configured to perform routines for rendering a displayable image for display by the display device.

10. The computing device of claim 8, wherein each shader processor of the GPU includes one or more Arithmetic Logic Units (ALUs), and wherein at least one shader processor of the GPU includes more ALUs than the CPU.

11. The computing device of claim 8, wherein the CPU and the GPU each include one or more Arithmetic Logic Units (ALUs), and wherein the CPU includes fewer ALUs than the GPU.

12. The computing device of claim 11, wherein each shader processor of the GPU includes a plurality of ALUs, and wherein the CPU is configured to execute instructions to instruct each shader processor of the GPU to decompress different portions of the operating system image in parallel.

13. The computing device of claim 8, further comprising a memory controller for managing CPU and GPU access to the non-volatile memory device and the volatile memory device.

14. A system for determining a distribution of a decompression load, the system comprising:
a volatile memory device;
a non-volatile memory device;
a graphics processing unit (GPU) of a computing device; and
a central processing unit (CPU), the CPU configured to execute instructions stored in the non-volatile memory device to:
determine a decompression load for the GPU defining an amount of decompression to be performed by the GPU;
instruct the GPU to decompress a first portion of a compressed operating system image stored in the volatile memory device;
determine a decompression speed of the GPU;
during a first condition, decrease the decompression load on the GPU; and
during a second condition, increase the decompression load on the GPU,
wherein the decompression load for the GPU includes decompressing an entirety of the compressed operating system image, and wherein increasing the decompression load comprises maintaining the decompression load and decreasing the decompression load comprises adjusting the decompression load to include decompressing a first amount of the operating system image with the GPU and decompressing a second amount of the operating system image with the CPU.

15. The system of claim 14, wherein the CPU is further configured to execute instructions to compare the decompression speed of the GPU to a threshold speed, and wherein the first condition comprises determining that the decompression speed is less than the threshold speed and the second condition comprises determining that the decompression speed is greater than the threshold speed.

16. The system of claim 15, wherein the CPU is further configured to execute instructions to set the speed threshold to the decompression speed during the second condition.

17. The system of claim 14, wherein the first condition comprises determining that the system is unstable and the second condition comprises determining that the decompression speed is greater than a speed threshold and the system is stable.

18. The system of claim 14, wherein the CPU is further configured to execute instructions to decompress a second portion of the operating system image while the GPU decompresses the first portion of the operating system image.

19. The system of claim 14, wherein the CPU is further configured to execute instructions to load one or more additional portions of the operating system image into the volatile memory device while the GPU decompresses the first portion of the operating system image.

\* \* \* \* \*